United States Patent [19]

Niggemann

[11] Patent Number: 4,459,082
[45] Date of Patent: Jul. 10, 1984

[54] SELF-ACTING AUTOMATIC CLEARANCE CONTROL APPARATUS FOR A TURBINE

[75] Inventor: Richard E. Niggemann, Rockford, Ill.

[73] Assignee: Sundstrand Corporation, Rockford, Ill.

[21] Appl. No.: 307,145

[22] Filed: Sep. 30, 1981

[51] Int. Cl.³ .............................................. F01D 21/04
[52] U.S. Cl. ....................................... 415/14; 415/47
[58] Field of Search ................... 415/13, 14, 116, 127, 415/138, 139, 537, 17, 20, 26, 47, 167, 113

[56] References Cited

U.S. PATENT DOCUMENTS

| B 471,735 | 2/1976 | Jaegtnes | 415/14 |
| 1,154,777 | 9/1915 | Kieser | 415/138 |
| 2,598,176 | 5/1952 | Johnstone | 415/113 |
| 2,992,618 | 7/1961 | Means | 415/113 X |
| 3,002,374 | 10/1961 | Jacobs | 415/14 X |
| 3,039,737 | 6/1962 | Kolthoff, Jr. | 415/113 X |
| 3,516,757 | 6/1970 | Baumann | 415/170 R |
| 4,063,742 | 12/1977 | Watkins, Jr. | 415/172 A |
| 4,334,822 | 6/1982 | Rossmann | 415/174 X |

FOREIGN PATENT DOCUMENTS

| 1058056 | 7/1979 | Canada | 415/113 |
| 1031868 | 6/1953 | France | 415/14 |
| 1175271 | 3/1959 | France | 415/113 |

Primary Examiner—Philip R. Coe
Assistant Examiner—Frankie L. Stinson
Attorney, Agent, or Firm—Harold A. Williamson; Ted E. Killingsworth; Michael B. McMurry

[57] ABSTRACT

A self-acting automatic clearance control apparatus for a turbine of the type which includes a turbine rotor mounted for rotation in a housing, the turbine rotor having cooperatively disposed on one side thereof a nozzle and on the other side an exhaust duct, the apparatus includes a control device positioned adjacent to the turbine rotor. The control device is coupled to the nozzle and the exhaust duct. The control device is responsive to changes in dimensions of said turbine rotor as the turbine operates over a range of temperatures to thereby change the relative position of the control device in respect of the turbine rotor whereby the clearance between the nozzle and the exhaust duct in respect to the turbine rotor is maintained automatically.

10 Claims, 6 Drawing Figures

SELF-ACTING AUTOMATIC CLEARANCE CONTROL APPARATUS FOR A TURBINE

TECHNICAL DESCRIPTION

This invention relates to a self-acting automatic clearance control apparatus for a turbine of the type which includes a turbine rotor mounted for rotation in a housing. The turbine rotor having cooperatively disposed on one side thereof a nozzle and on the other side an exhaust duct.

BACKGROUND ART

The performance of a reentry type turbine is critically dependent on maintaining tight clearances in the region between the turbine rotor, the nozzle and the collector duct assembly that supports the exhaust duct. The reason is that the just defined region is at a pressure level intermediate to those of the inlet and exhaust pressure. Because the pressure in this region is higher than the contiguous zone surrounding the region, gas leaks from the region to the lower pressure zone. This leakage represents wasted energy.

In most applications the turbine assembly is required to handle hot gas and also must be able to accept the hot gas from a cold start. Invariably, this type of operation leads to a thermally induced differential growth of the turbine rotor and mating support components which affects the clearance between the rotor and the mating stationary support components of the housing. Because of this thermally induced differential growth, the clearances between the turbine's mating components when the turbine assembly is cold must be large enough to allow for the thermally induced differential growth that arises during the period from cold start to normal operating temperature. These large clearances are definitely undesirable from a turbine performance stand point.

The problem defined above has been recognized in part in the Kolthoff, Jr. U.S. Pat. No. 3,039,737 ('737) in respect of thermally induced radial growth of a turbine rotor. The '737 patent provides a means for thermally varying the internal diameter of the shroud surrounding the rotor to compensate for thermally induced changes in the diameter of the rotor. The invention to be described hereinafter accomplishes not only a change in the radial clearance as a consequence of thermally induced radial growth, but also maintains a controlled clearance between the nozzle and the collector duct assembly in response to thermally induced changes in the axial location of the rotor. The maintenance of the aforementioned clearances being dependent on the actual changes in the turbine rotor dimensions and does not need as the '737 patent requires a means that attempts to heat surrounding turbine cooperating support structures to the same temperature as the rotor in order that the housing and rotor experience the same thermal growth. It should also be kept in mind that the '737 patent assumes that all cooperating support structures will respond in a uniform thermal growth manner which in practice tends not to be the case.

DISCLOSURE OF INVENTION

More specifically this invention relates to a self-acting, automatic clearance control apparatus for a turbine of the type which includes a turbine rotor mounted for rotation in a housing. The turbine rotor having disposed on one side thereof a nozzle, and on the other side an exhaust duct. The apparatus includes in combination a control device positioned adjacent the turbine rotor. The control device is coupled to the nozzle and the exhaust duct. The control device is responsive to changes in dimensions of the turbine rotor as the turbine operates over a range of temperatures to thereby change the relative position of the control device in respect of the turbine rotor, whereby the clearance between the nozzle and the exhaust duct in respect to said turbine rotor is maintained automatically. The invention additionally provides automatic radial rotor end clearance control and includes a low thermal distortion construction that allows for mating turbine components to experience uniform but different temperatures with low thermal distortion.

It is therefore a primary object of the invention to provide a self-acting automatic clearance control for a turbine which turbine operates over a range of temperatures. The clearance control is provided by a control device that is responsive to changes in the turbine rotor dimensions of both a radial rotor growth and the axial location of the rotor.

Another object of the invention is to provide a clearance control device that utilizes a flow network that includes orifices and bellows type motors to maintain a very tight clearance between the nozzle and exhaust duct supports that are mutually coupled to the clearance control device.

A final object of the invention is to provide a low thermal distortion construction for a turbine which utilizes a low heat transfer rate material on the surfaces of the clearance control device that are in mating relationship with the turbine rotor.

In the attainment of the foregoing objects, the invention contemplates in its preferred embodiment, a self-acting automatic clearance control apparatus for a reentry type turbine of the type that includes a turbine rotor mounted for rotation in a housing. The turbine rotor having cooperatively disposed on one side thereof a hot gas nozzle, and on the other side an exhaust duct.

The apparatus includes a control device positioned adjacent to the turbine rotor and adjustably secured to the housing for limited movement in a direction parallel to the axis of rotation of the turbine rotor.

The clearance control device cooperates with the radially located extremities of the turbine rotor and is responsive to changes in dimensions of the turbine rotor as the turbine operates over a range of temperatures. Changes in rotor dimensions result in a change in the relative position of the control device in respect of the turbine rotor.

The clearance control device is provided with a flow network that includes a source of fluid under pressure coupled in parallel to first, second and third mechanisms that expand or contract in response to fluid pressure changes in the network. The first and second mechanisms are hydraulically coupled to each other and each is separately respectively coupled one to a nozzle support block, and the other to a collector duct assembly that supports the exhaust duct.

The flow network includes a pair of orifices that are coupled respectively via the network each to one of the mechanisms. One of the pair of orifices is located in the nozzle support block and fluid flow through the orifice is directed against the turbine rotor extremity along a line parallel to the axis of rotation of the turbine rotor.

The other of the orifices is located in the collector duct assembly that supports the exhaust duct. Fluid flow through the orifice is directed against the other side of the turbine rotor in a direction axially opposing the first mentioned orifice flow along the line parallel to the axis of rotation of the turbine rotor. Differential thermal growth between the turbine rotating assembly and its housing, specifically from the axial location of the thrust bearing, results in a change in the axial location of the turbine rotor with respect to the housing and therefore a change in the clearance between the orifices and the turbine rotor extremity which causes a change in the flow rate from the orifices. The change in flow rate thereby causes the first and second mechanisms to expand or contract in response to the changes in flow rate to thereby move the nozzle support block and the collector duct assembly that supports the exhaust duct in response to the differential thermal growth of the turbine rotating assembly and the housing.

A third mechanism is coupled to the control device to apply a force in a radial direction to the control device to accomodate radial thermal and centrifugal growth of the turbine rotor.

The flow network has yet another orifice positioned adjacent to the circumference of said turbine rotor and this orifice provides fluid flow in a direction along a radial line passing through said turbine rotor and at right angles to the axis of rotation of the rotor.

The radially positioned orifice is coupled to the flow network in parallel to the third mechanism.

A fourth mechanism is coupled to the collector duct assembly that supports the exhaust duct and to the control device. The fourth mechanism applies a force in a radial direction to the control device responsive to changes in pressure in the exhaust duct. The third and fourth mechanisms cooperate to provide a net radial force on the control device to thereby maintain a radial clearance between the turbine rotor and the control device.

The preferred embodiment of the invention additionally features in combination with the nozzle support block and the collector duct assembly that supports the exhaust duct, a radial gas containment unit coupled to the nozzle support block and the collector duct assembly.

The nozzle block, the collector duct assembly and the radial gas containment unit are each integrally provided with a low heat transfer rate material in the region adjacent the turbine rotor outer end to thereby ensure that thermal input rate from hot gases to the nozzle block, the collector duct assembly and the radial gas containment means is minimized. The incorporation of low heat transfer rate material thereby establishes low thermal distortion due to unsymetrical heating of the nozzle block, the collector duct assembly and said radial gas containment unit. This facet of the invention additionally incorporates a means to bias the radial gas containment unit toward the nozzle block to thereby allow the total assembly to experience uniform but different temperatures with resultant low thermal distortions.

Other objects and advantages of the present invention will be apparent upon reference to the accompanying description when taken in conjunction with the following drawings:

BEST MODE FOR CARRYING OUT THE INVENTION

Figure 1:
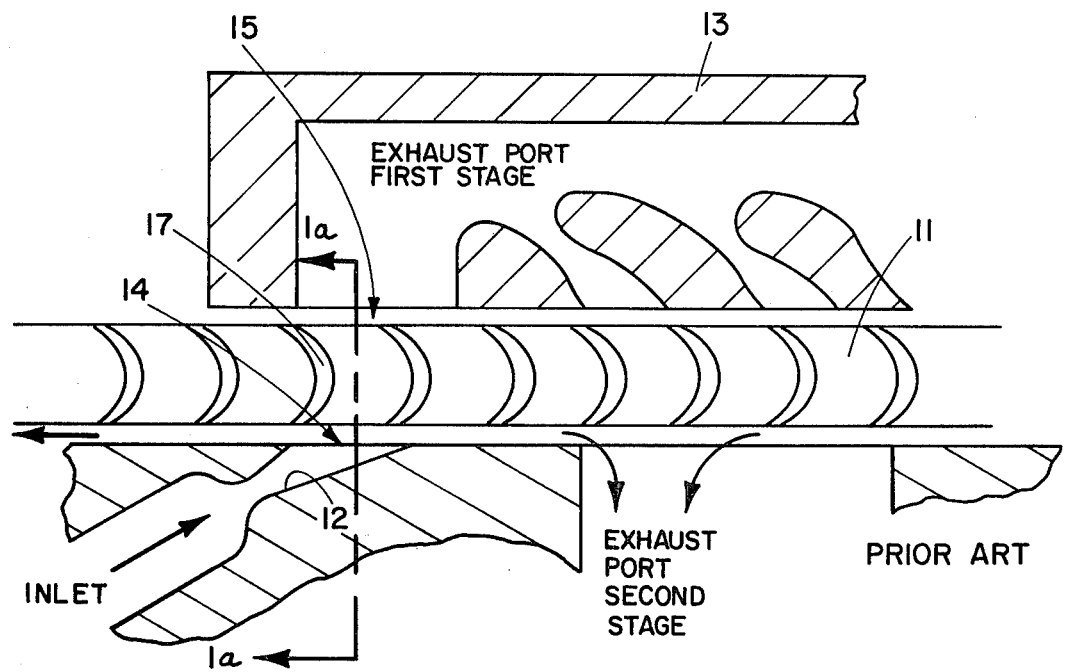
FIG. 1 illustrates the prior art.
Figure 1A:
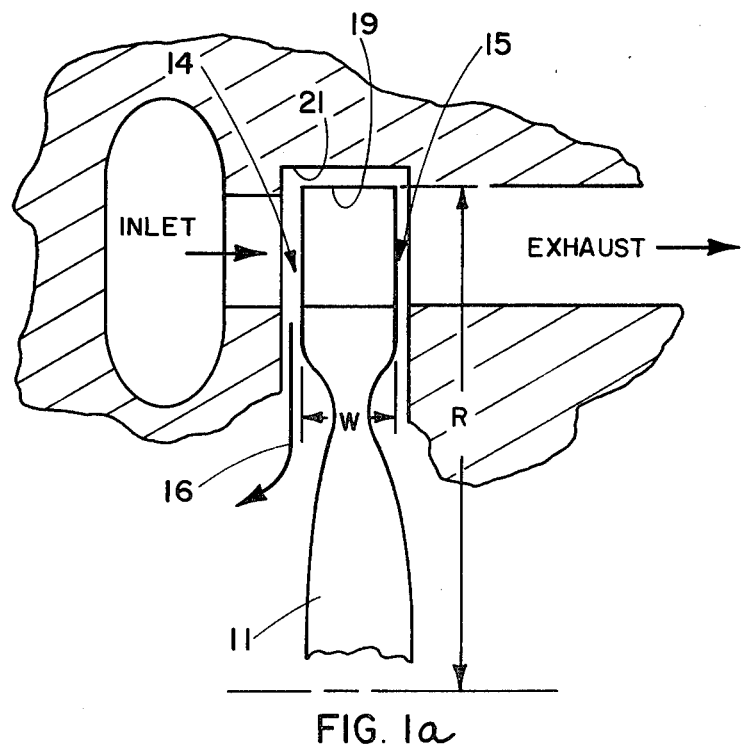
FIG. 1a illustrates the prior art and presents a view taken along the line 1a—1a of FIG. 1.

Reference is now made to FIG. 1. and FIG. 1a which illustrate a prior art two-stage reentry turbine with opposed flows in both stages. In FIG. 1 there is provided a diagramatic illustration depicting the spatial relationship existing between a reentry turbine rotor 11, hot gas nozzle 12 and exhaust duct 13. The exhaust port of the first stage is labeled with a legend, as is the exhaust port of the second stage, and the inlet to the hot gas nozzle 12. The rotor 11 is shown spaced away from the body of exhaust duct 13 at the points designated by reference numerals 14, 15. In FIG. 1a, the leakage path depicted by arrow 16 represented, one of the several sources of energy loss as the gas under high pressure from the inlet passes through hot gas nozzle 12 on its way to and through the buckets 17, 18 of the turbine rotor 11. Leakage of the same type also occurs at the point 15. A third leakage path 20 is present between the end 19 of the rotor 11 and the radial gas containment surface 21. It should be understood that typically the hot gas nozzle 12 and the exhaust duct 13 are secured physically, and therefore thermally, to a housing not shown. The rotor 11 is also mounted for rotation in the housing in a manner not shown but conventional.

It is believed to be readily apparent that when the prior art reentry turbine arrangement depicted in FIG. 1 and FIG. 1a experiences a cold start, hot gases from the nozzle 12 impinges upon the buckets 17, of the rotor 11, and the rotor experiences a rapid heating. The rotor and its shaft will heat up at a substantially faster rate than will the stationary housing surrounding the rotating assembly. The turbine thrust bearing (not shown) is the axial location where the rotating assembly and the stationary housing are grounded, i.e., the invariant reference point for assessing differential thermal growth. For discussion purposes it is assumed that the thrust bearing is located to the left of the turbine rotor as shown in FIG. 1a.

Because the turbine rotor and shaft heat up substantially faster than the housing, axial thermal expansion of the rotating assembly will initially tend to close clearance space 15 while opening 14. Radial thermal and centrifugal growth will tend to close the radial clearance 19. When the housing finally does heat up its thermal growth will tend to open 15, close 14 and close 20. It should also be recognized that during start-up from a cold condition, the stationary components of the inherently unsymmetric reentry turbine assembly such as the structure not referenced that supports the hot gas nozzle 12 and the exhaust duct 13 are heated unevenly. This uneven heating results in circumferential and axial thermal distortions of the various structures. In order to eliminate the possibility of the rotor 11 physically engaging or scraping the nozzles or support structures, as well as the radial gas containment and surface 21, relatively large values of clearance dimensions 14, 15 and 19 are required. These large clearances result in substantial performance degradation due to gas leakages as previously described. The invention now to be described in respect of FIGS. 2 through 5 completely removes the possibility of such damage, while enabling the use of substantially small values of clearances which result in higher turbine performance.

Figure 2:
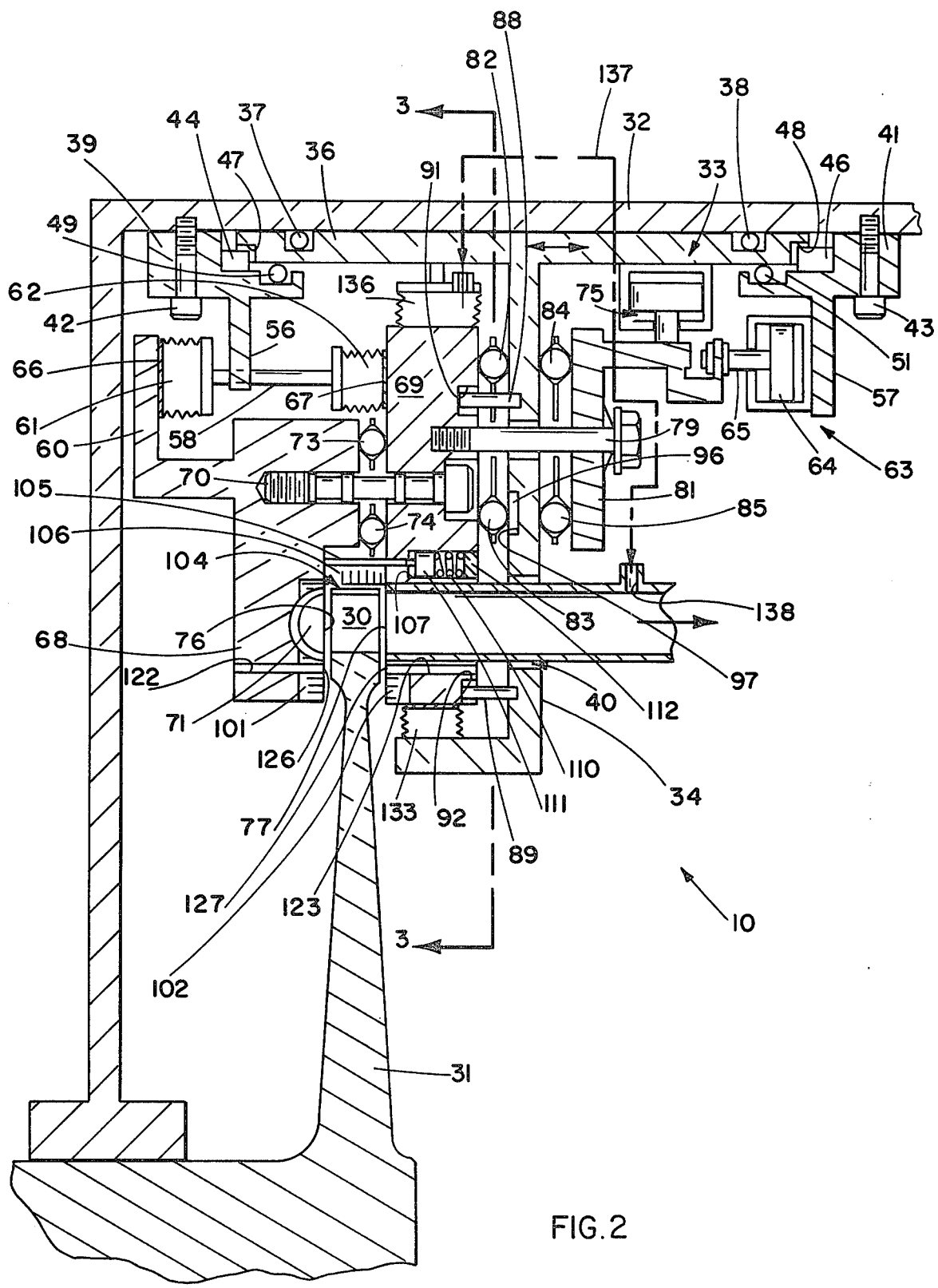
FIG. 2 is a general arrangement featuring all aspects of the invention.

Reference is now made to FIG. 2 which illustrates one embodiment of the invention that features all aspects of the invention. At the outset it should be understood that those features of a conventional reentry turbine not shown in the illustration are considered well known and therefore the details of construction are not present nor deemed necessary to an understanding of the operation of the invention to be described.

In FIG. 2 there is shown in a turbine rotor 31 mounted for rotation within a stationary generally cylindrical housing 32. An arrow is directed to a carrier assembly 33 which assembly 33 is slidably attached to the housing 32. The carrier assembly 33 includes a radial directed flange 34 and an axially positioned slide member 36. The slide member 36 of the carrier assembly 33 is mounted on bearings 37, 38. The carrier assembly 33 is mounted for limited axial movement and held in place by clamp members 39, 41 which clamp members 39, 41 are in turn secured to the housing 32 by bolts 42, 43. Each of the clamp members 39, 41 is provided with key like protrusions 44, 46 which mate with axially aligned grooves 47, 48 located in the slide member 36. The key like protrusions 44, 46 and cooperating grooves 47, 48 serve the function of maintaining axial allignment of the carrier assembly 33. Bearings 49, 51 position as shown between the clamp members 39, 41 allow the slide member 36 to move freely over a distance determined by the clamp members 39, 41 which are secured to the housing 32.

Each of the clamp members 39, 41 have radially projecting clamp elements 56, 57. Radially projecting clamp element 56 has secured thereto bellows rod member 58 which has at either end first and second mechanisms or bellows 61, 62 that expand or contract in response to pressure changes therein. The bellows 61 and 62 are connected by the flow network of FIG. 3, the operation of which will be described more fully hereinafter.

Radially projecting clamp element 57 has secured thereto an axial movement damper 63 having a piston 64 and piston rod 65 mounted as shown. The operation of axial movement damper 63 will be explained more fully hereinafter.

A nozzle support block 68 or nozzle support means, as it may be termed, and a collector duct assembly 69 are pin bolted together as shown by a single bolt 70. The necked down bolt is intended to minimize thermal conduction between the nozzle block 68 and the collector duct assembly 69. The nozzle support block 68 has secured thereto hot gas nozzle 71, and the collector duct assembly 69 has secured thereto exhaust duct 72. The nozzle support block 68 and the collector duct assembly 69 are spaced apart by three ceramic caged balls in a triangular pattern. Two of the caged balls, namely 73, 74 are shown. The ceramic balls 73, 74 are sized to maintain parallelism between the critical surfaces 76, 77 adjacent to the rotor 31. The ceramic balls 73, 74 also function to maintain the total axial clearance between the nozzle support block 68, the collector duct assembly 69 and the rotor 31. The bolt 70 and the ceramic balls 73, 74 have minimal contact with the nozzle support block 68 and the collector, duct assembly 69 to minimize the heat transfer rate between them. The nozzle support block 68 may run 400° F. to 600° F. hotter than the collector duct and this method of attachment allows the parts to grow relative to each other without causing distortions.

The combined nozzle support block 68 and the collector duct assembly 69 are slidably attached to the carrier assembly radially directed flange 34 by means of a bolt 79, clamping plate 81 and two sets of three caged balls, four of which namely 82, 83, 84 and 85 are shown in FIG. 2. The caged balls are interposed between the collector duct assembly 69, the carrier assembly radially directed flange 34, and the radially directed flange 34 and the clamping plate 81. Alignment pins 88, 89 are secured as shown to the carrier assembly radial directed flange 34 and engage slots 91, 92 in collector duct assembly 69. The alignment pins 88, 89 and slots 91, 92 keep the collector duct assembly 69 from cocking in the circumferential direction. This feature can be seen more clearly in FIG. 3, which is a cut through view along the line 3—3 of FIG. 2, with the ball cage removed from the balls 82, 83.

It is also clear from FIG. 2 that the two sets of three balls, which include as shown, ball pairs 82, 83, and 84, 85, determine the planes of the critical areas of the collector duct assembly 69 and the nozzle support block 68 adjacent to the blading 30 of the rotor 31. Shims, such as 96, one of which is shown, are inserted in a recess 97 of the carrier assembly radial extending flange 34. The two lower balls, one of which 83 is shown in conjunction with the aforementioned shims 96 allow the critical clearance spaces to be adjusted to be parallel to the rotor blading 30.

Metal honeycomb 101, 102 is used to line the faces of the nozzle support block 68 and the collector duct assembly 69 in the critical clearance areas adjacent to the blading 30. The metal honeycomb may be secured by brazing. The metal honeycomb 101, 102 has a low heat transfer rate and is utilized to minimize the thermal input to the nozzle support block 68 and the collector duct assembly 69 from the hot gases flowing from these areas.

This creative feature just described has primary importance at start up when the turbine parts are cool. If high heat fluxes were allowed, the unsymetrical heating would cause significant distortions to the nozzle support block 68 and the collector duct assembly 69, which would affect the critical clearances both in magnitude and the parallelism of the clearance spaces in respect of the rotor. Because of the need to recognize the matter of thermal response, the hot gas nozzle 71 is shown as an "insert" type nozzle which has minimal contact between the nozzle 71 and the nozzle support block 68. The exhaust duct 72 also has minimal contact, as shown, with the collector duct assembly 69. The exhaust duct 72 passes through an opening 40 in the carrier assembly radially directed flange 34 and heat transfer to the support structures illustrated is thereby minimized.

Since the entire area around the rotor end or extremity defined by the rotor blades 30, which is adjacent to the nozzle support block 68 and collector duct assembly 69, is at an elevated pressure compared to zones outside of this area, the radial clearance space 104 above the blade tips is also critical. If this space 104 or gap is large, a significant amount of gas will leak in the circumferential direction over the blade tips. The metal band 105 is inserted into a circumferential slot 107 cut in the collector duct assembly 69. The metal band 105 is captured at either of its end by the termination of the slot 107. The circumferential slot is thus a track for the metal band 105 to allow differential thermal growth of the band with respect to the collector duct assembly 69 without causing thermal distortions. The band 105 has a small but positive clearance in this slot 107 to allow this differential thermal growth to be accomodated. The band 105 is pressed tight against the nozzle support block 68 to affect a good gas seal. The band 105 is biased or pressed by means of springs and push rods, such as spring 110 and push rod 111. A plug 112 holds the spring 110 and push rod 111 in place in the collector duct assembly 69 as shown.

Figure 3:
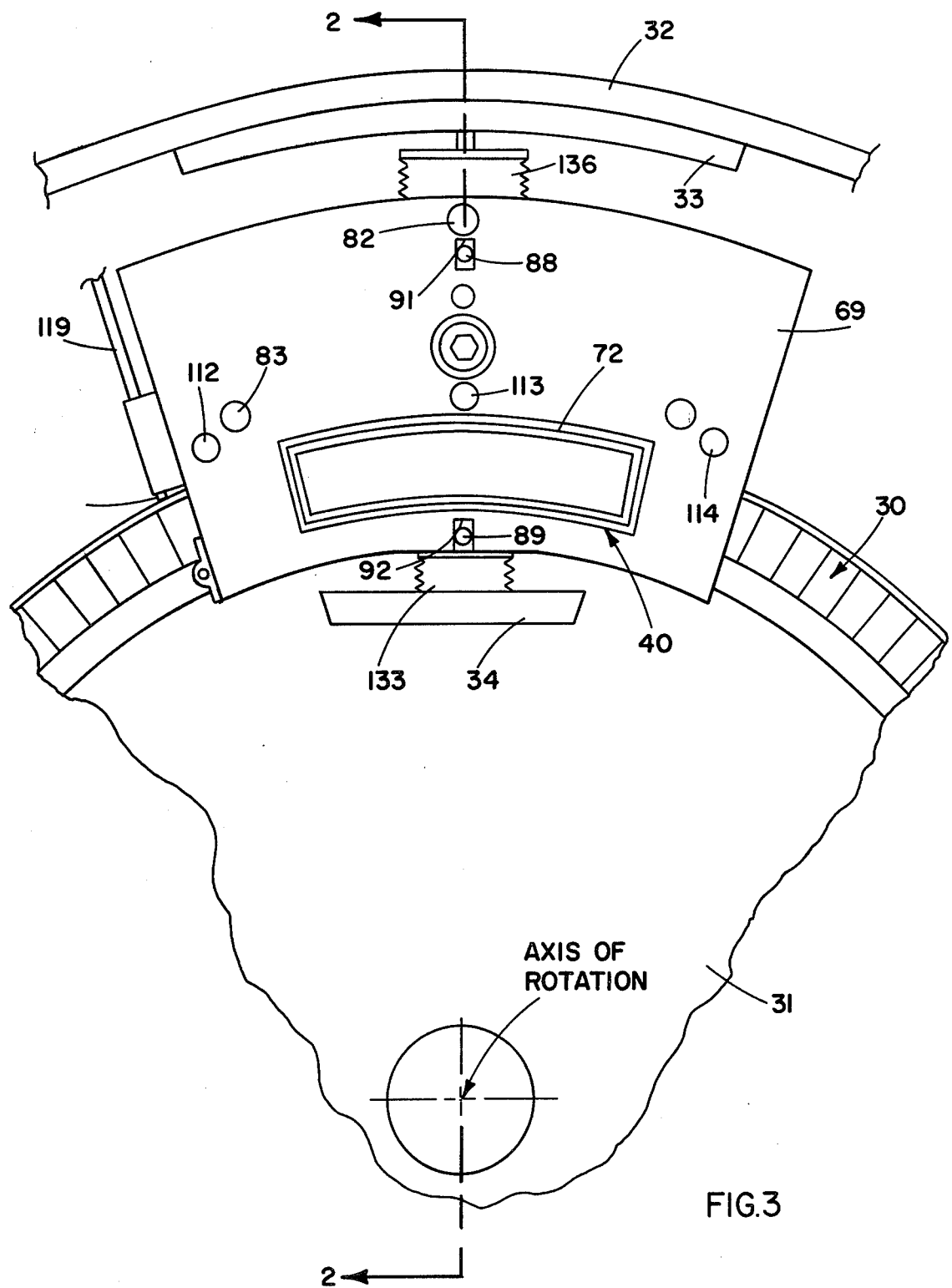
FIG. 3 is a view taken generally along the line 3—3 of FIG. 2.

In FIG. 3, plugs 112, 113 and 114 are shown. This construction will allow the various parts to achieve uniform but different temperatures with low thermal distortions. It is also assumed that the housing 32 will be maintained at a nearly uniform temperature (20° F. variation) in the cylindrical portion and either uniform or radially varying in dimension only (no circumferential variation) in the circular portion of housing 32, which attaches to a rotor bearing assembly (not shown). This construction will ensure that the housing thermal distortions will not be of sufficient magnitude to upset the critical clearances around the rotor. In order to achieve this requirement it is contemplated that there be provided hot gas liners or false walls adjacent to the housing 32 on the inside thereof to limit gas convection heat transfer to the housing 32, or to the parts attached to the housing. It is also contemplated that the outside of housing 32 be actively cooled by some suitable means.

The housing and nozzle-collector duct assembly as set forth above will result in a unit in which the critical clearance spaces are essentially parallel to the parts of the rotor to which they are adjacent. However, the turbine rotor disk and its shaft will heat up at a different rate and achieve substantially different temperature levels. This will result in the turbine rotor plane moving axially (due to thermal growth and perhaps housing pressure loads) at a different rate and greater total distances than the plane containing the nozzle would, if it were fixedly attached to the housing 32.

Also, the radial growth of the rotor 31 will be different than that of the housing 32.

The operation of the self-acting clearance control apparatus will now be described.

The clearance control device of the apparatus is indicated by the arrow associated with reference numeral 10. The control device of the invention cooperates in a manner now to be described with the turbine rotor 31, the hot gas nozzle 71, and the exhaust duct 72.

The various components of the control device 10 are positioned as has been described adjacent the rotor 31. The control device positions the carrier assembly 33 axially to maintain equal axial clearances between the rotor blading 30, the nozzle support block 68 and the collector duct assembly 69.

The axial movement of the carrier assembly 33 is accomplished by stroking the bellows 61, 62 in a manner to be described, to move the carrier assembly 33 to its proper position. The bellows 61, 62 are provided respectively with bellows end slide plates 66, 67 to allow relative sliding movement between the bellows 61, 62, nozzle block extension 60 and collector duct assembly 69.

Figure 4:
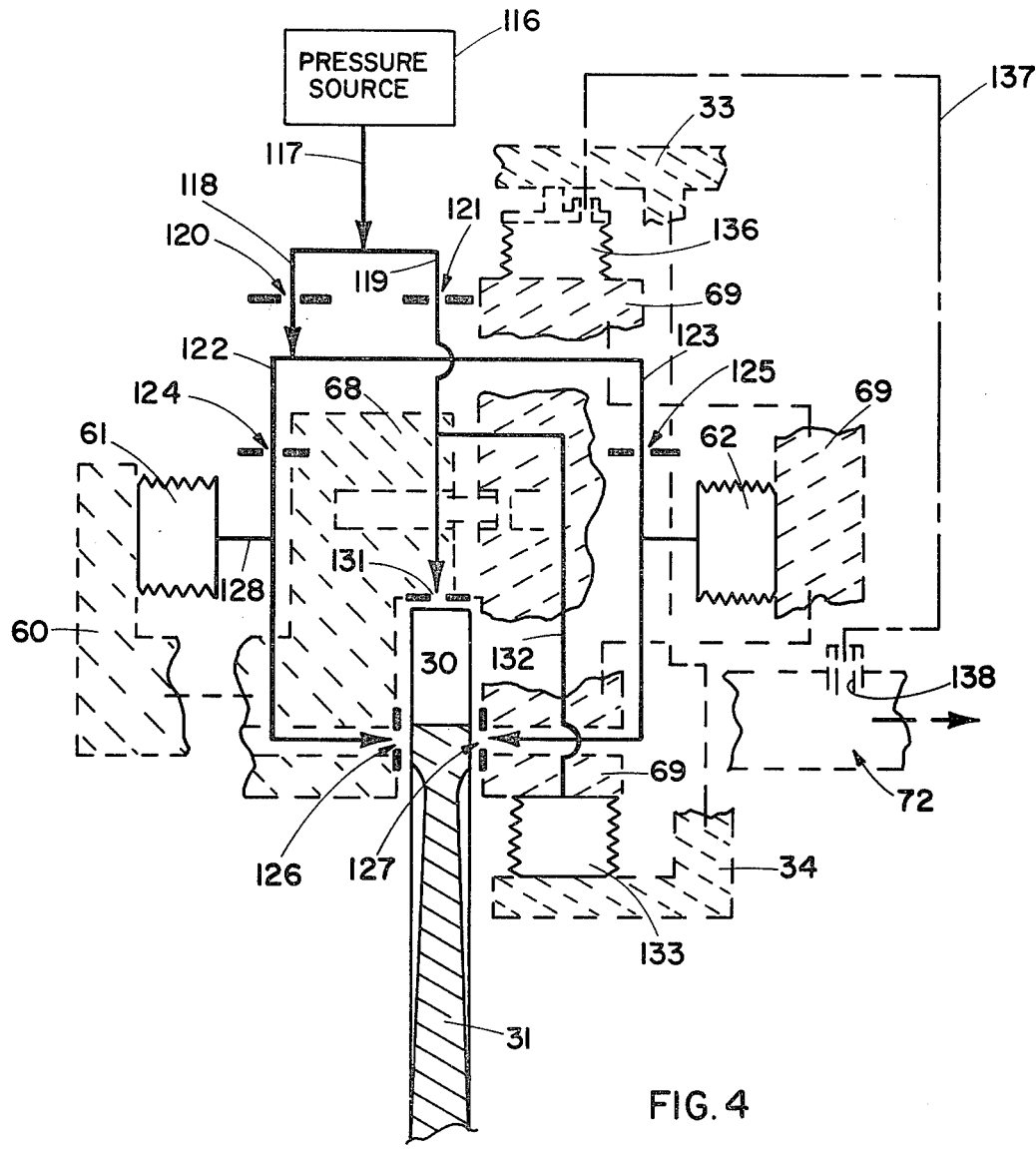
FIG. 4 is a flow network diagram for use with the invention.

Reference is now made to FIG. 4 which should be studied in conjunction with FIG. 2. In order to better understand the invention, FIG. 4 in full line depicts the flow network of the invention, which flow network includes a source of fluid under pressure 116, connected by flow line 117, to parallel flow lines 118, 119. Each of the flow lines 118, 119 has shown schematically, choked orifice sections 120, 121 which are provided to limit total flow and ensure that flow in the flow network circuit downstream is constant. Parallel flow line 118 is in turn connected to parallel flow lines 122, 123 which also schematically shows choked orifices 124, 125 in the lines 122, 123. The flow lines 122, 123 terminate with orifices 126, 127 which are directed towards each other and against the side of the turbine rotor extremity as can best be observed in FIG. 2. The fluid flow from the orifices 126, 127 is directed along a line parallel to the axis of rotation of the turbine rotor. The flow lines 122, 123 are connected by flow lines 128, 129 up stream of the respective orifices 126, 127 to first and second bellows 61 and 62. The bellows 61, 62 expand or contract with pressure changes experienced therein.

The pressure source 116 also provides fluid flow along flow line 117 and parallel flow line 119 past choke 121 to radial orifice 131 positioned adjacent the circumference of the rotor 31, as can best be seen in FIG. 3. The radial orifice 131 has fluid flow in a direction along a radial line passing through the rotor 31 and at right angles to the axis of rotation of the rotor. A third bellows 133 is coupled to the flow network line 132 in parallel relation to the radial orifice 131.

A fourth bellows 136 is positioned as shown between the collector duct assembly 69 and the carrier assembly 33. The bellows 136 is connected as shown by broken line 137 to an opening 138 in exhaust duct 72.

In operation, the pressure level in the first and second bellows 61, 62 varies by virtue of the flow network shown in FIG. 4, such that when the clearance between the nozzle 71 and the rotor 31 is getting small, the pressure in bellows 61 goes up, while the pressure in bellows 62 goes down. This happens because the orifices 126, 127 (FIG. 2 and FIG. 4) have an effective flow area which decreases as the clearance between the orifice and the rotor decreases, and the effective flow increases as the clearance increases. Thus, if the extremities of rotor 31 approach the nozzle support block 68 to which orifice 126 is attached, the effective flow area of the orifice 126 is decreased, while the flow area of the orifice 127 is increased. This fact, with the flow network shown, will automatically result in raising the pressure level in the bellows 61 while lowering the pressure level in bellows 62. This will cause a net force on carrier assembly 33 tending to move it in a direction to increase the clearance between the nozzle support duct 68 and the rotor 31. Axial motion is resisted by damper 63 as shown and briefly described in respect of FIG. 2. The damper 63 is designed to strongly resist rapid movements.

This strong damping is desirable so that the carrier assembly 33 is unresponsive to vibratory or shock type transient inertial loads imposed by the housing 32. That is, the damping action of the damper 63 is of such a magnitude that the carrier assembly 33 is essentially solidly fixed to the housing 32 for the frequencies of vibrations and shock loads, but responsive to movement of the clearance control device induced by the relatively slow thermal differential growths of the rotor 31 and housing 32.

The radial clearance between the blade tips and the circumferential honeycomb 106, attached to band 105, is maintained in a similar manner to the axial clearance except that there is only one bellows 133 which is the third bellows of the flow network of the radial clearance control portion of the flow network.

In operation, there is an upward pressure force in the collector duct assembly 69 due to the pressure difference across the band 105. The gas pressure in this area is very nearly that which exists in the exhaust duct 72. A small line 137 connects the bellows 136 to the gas pressure in exhaust duct 72. The area of bellows 136 is chosen so that it produces a larger downward force than the inherent upward force caused by the pressure difference drop across the band 105. The flow circuit controlling the pressure in bellows 133 is sized so that the net radial force on the collector duct assembly 69 is zero when the desired tip clearance is reached. The radial damper 75 resists rapid radial movements and is similar in operation to axial damper 63. The axial damper 63 and its piston are fitted in a radial slot not shown in damping plate 81.

Figure 5:
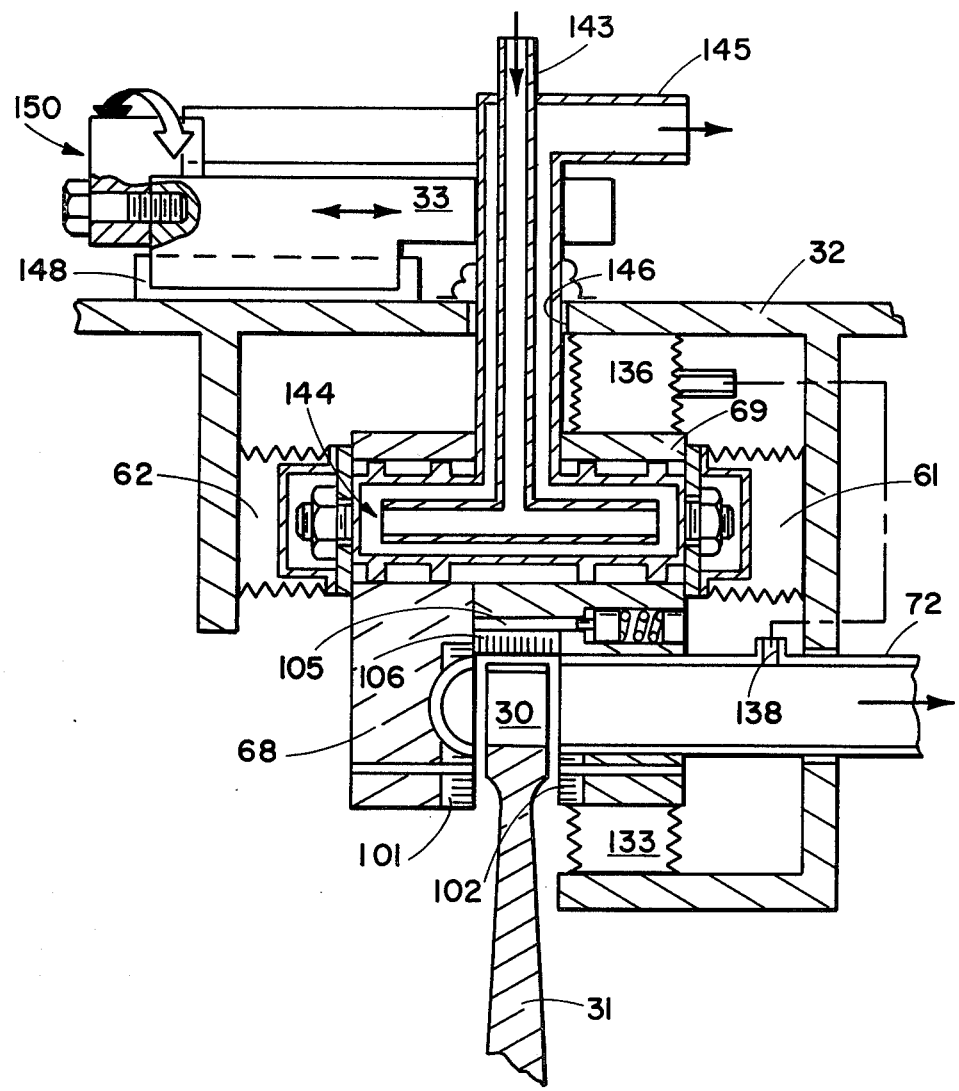
FIG. 5 is the preferred embodiment of the invention.

Reference is now made to FIG. 5 in which there is illustrated a preferred embodiment of the invention. In the description that follows in respect of FIG. 5 wherever possible, reference numerals and component designation which correspond to the same components described in earlier figures will be employed.

In FIG. 5 fluid cooling is provided to nozzle support block 68 and collector duct assembly 69 via a fluid inlet tube 143 which delivers cooling fluid to a chamber 144. Concentrically mounted fluid return tube 145 expels fluid used in cooling.

It can be seen that the fluid return tube 145 passes through an opening 146 in housing 32. Mounted externally of the housing 32 is axial slidable member 33 provided with a dove tail fit to dove tail base 148. The frictional reaction between the member 33 and the dove tail base 148 provides for axial damping of the type provided for by damper 63 in FIG. 2. At the point where the tube 145 passes through the member 33 there is provided a fairly tight fit, which fit provides the desired radial damping action of the type provided by radial damper 75 in FIG. 2. It should be understood that these friction or tight fits just recited may be provided with an application of a grease type material to provide the desired level of damping action desired as a consequence of the relative movement of the abutting parts.

Angular or circumferential pivotal adjustment can be accomplished by adjustable bolt and flange arrangement 150.

It will be apparent in a purely pictorial sense that bellows 62 and 61 appear reversed in respect of the showing of FIGS. 2 and 4. However, when the operative description of FIG. 4 is applied to FIG. 5 with the bellows designation reversed, the operation will be found to be the same.

It should also be understood that the fluid inlet tube 143 and return tube 145 provide the same function as the elements 82, 83, 84 and back-up plate 81 of FIG. 2.

Although this invention has been illustrated and described in connection with the particular embodiments illustrated, it will be apparent to those skilled in the art that various changes may be made therein without departing from the spirit of the invention as set forth in the appended claims.

I claim:

1. A self-acting automatic clearance control apparatus for a turbine of the type which includes a turbine rotor mounted for rotation in a housing, said turbine rotor having cooperatively disposed on one side thereof a nozzle and on the other side an exhaust duct, said apparatus including in combination,
control means positioned adjacent to said turbine rotor and having portions thereof, on both sides of said turbine rotor, said control means coupled to said nozzle and said exhaust duct, said control means responsive at least to changes in dimensions of said turbine rotor as said turbine operates in a direction parallel to the axis of rotation of said turbine rotor, over a range of temperatures to thereby change the relative position of said control means in respect of said turbine rotor whereby the clearance between said nozzle and said exhaust duct in respect to said turbine rotor is maintained automatically.

2. The apparatus of claim 1 wherein said turbine is a reentry turbine and said nozzle is of a hot gas type.

3. The apparatus of claim 1 wherein said control means is adjustably secured to said housing for limited movement in a direction parallel to said axis of rotation of said turbine rotor.

4. The apparatus of claim 1 wherein said clearance control apparatus cooperates with the radially located extremities of said turbine rotor.

5. The apparatus of claim 4 wherein one of said change in dimensions involves a change in the axial location of the turbine rotor at said radial extremity meansured along a line parrallel to said axis of rotation of said turbine rotor.

6. The apparatus of claim 5 wherein another of said dimensions involves a change in the turbine rotor radius.

7. The apparatus of claim 5 wherein there is provided a flow network that includes a source of fluid under pressure coupled in parallel to first and second mechanisms that expand or contract in response to fluid pressure changes in said network, said mechanisms coupled to each other and each separately respectively coupled one to a nozzle support means and the other to an exhaust duct support means,
a pair of orifices coupled via said network respectively each to one of said mechanisms, one of said pair of orifices located in said nozzle support means and fluid flow through said orifice directed against said turbine rotor extremity along a line parallel to said axis of rotation of said turbine rotor,
the other of said orifices located in said exhaust duct support means and fluid flow through said orifice directed against the other side of said turbine rotor in a direction axially opposing said one orifice along said line parallel to said axis of rotation of said turbine rotor, thermal growth of said turbine rotor results in a change in the axial location of said turbine rotor and therefore a change in the clearance between said orifices and said turbine rotor extremity which causes a change in the flow rate from said orifices, said change in flow rate thereby causing said first and second mechanisms to expand or contract in response to said changes in flow rate to thereby move said nozzle support means and said exhaust duct support means in response to said thermal growth of said turbine rotor.

8. The apparatus of claim 6 wherein there is provided a flow network that includes a source of fluid under pressure coupled in parallel to first, second and third mechanisms that expand or contract in response to fluid pressure changes in said network, said first and second mechanisms coupled to each other and each separately respectively coupled one to a nozzle support means and the other to an exhaust duct support means, a pair of orifices are coupled respectively via said network each to one of said mechanisms, one of said pair of orifices located in said nozzle support means and fluid flow through said orifice directed against said turbine rotor extremity along a line parallel to said axis of rotation of said turbine rotor, the other of said orifices located in said exhaust duct support means and fluid flow through said orifice directed against the other side of said turbine rotor in a direction axially opposing said one orifice along said line parallel to said axis of rotation of said turbine rotor, thermal growth of said turbine rotor results in a change in the axial location of said turbine rotor and therefore a change in the clearance between said orifices and said turbine rotor extremity which causes a change in the flow rate from said orifices, said change in flow rate thereby causing said first and second mechanisms to expand or contract in response to said changes in flow rate to thereby move said nozzle support means and said exhaust duct support means in response to said thermal growth of said turbine rotor, said third mechanism coupled to said control means to apply a force in a radial direction, said flow network having an orifice positioned adjacent the circumference of said turbine rotor, said orifice having fluid flow in a direction along a radial line passing through said turbine rotor and at right angles to said axis of rotation, said radially positioned orifice coupled to said flow network in parallel to said third mechanism, a fourth mechanism coupled to said exhaust duct and to said control means, said fourth mechanism applying a force in a radial direction to said control means responsive to changes in pressure in said exhaust duct, said third and fourth mechanisms cooperating to provide a net radial force on said control means to thereby maintain a radial clearance between said turbine rotor and said control means.

9. The apparatus of claim 1 wherein there is provided a first radial clearance control mechanism coupled to said control means to apply a force to said control means in a radial direction along a line parallel to the plane of said turbine rotor, a flow network that includes a source of fluid under pressure coupled to said first radial clearance control mechanism, said flow network having an orifice positioned adjacent the circumference of said turbine rotor, said orifice having fluid flow in a direction along a radial line passing through said turbine rotor and right angles to the axis of rotation of said turbine rotor, said radially positioned orifice coupled to said flow network in parallel to said first radial clearance control mechanism, a second radial clearance control mechanism coupled to said exhaust duct and to said control means, said second mechanism applying a force to said control means in a radial direction along a line parallel to said plane of said turbine rotor, said second means responsive to changes in pressure in said exhaust duct, said first and second radial clearance control mechanisms cooperating to provide a net radial force on said control means to thereby maintain a radial clearance between said turbine rotor and said control means.

10. The apparatus of claim 7, 8 or 9 wherein there is provided damping means coupled to said control means, said damping means having the characteristic of strongly resisting rapid movements of said control means.

* * * * *